(12) United States Patent
Menny et al.

(10) Patent No.: US 11,701,804 B2
(45) Date of Patent: Jul. 18, 2023

(54) METHOD FOR PRODUCING A PART FROM A PARTICULATE NATURAL MATERIAL AND PART OBTAINED BY SUCH A METHOD

(71) Applicants: AUTHENTIC MATERIAL, Toulouse (FR); TOULOUSE TECH TRANSFER, Toulouse (FR); INSTITUT NATIONAL POLYTECHNIQUE DE TOULOUSE, Toulouse (FR); CENTRE NATIONAL DE LA RECHERCHE SCIENTIFIQUE, Paris (FR); INSTITUT NATIONAL DE RECHERCHE POUR L'AGRICULTURE, L'ALIMENTATION ET L'ENVIRONNEMENT, Paris (FR)

(72) Inventors: Vincent Menny, Portet sur Garonne (FR); Antoine Rouilly, Toulouse (FR); Alain Couret, Saverdun (FR); Dimitri Mazars, Belberaud (FR); David Neumeyer, Ramonville Saint Agne (FR); Virginie Vandenbossche, Sainte-Foy-d'Aigrefeuille (FR); Jean Monchoux, Toulouse (FR); Foad Naimi, Venarey les Laumes (FR)

(73) Assignees: AUTHENTIC MATERIAL, Toulouse (FR); TOULOUSE TECH TRANSFER, Toulouse (FR); INSTITUT NATIONAL POLYTECHNIQUE DE TOULOUSE, Toulouse (FR); CENTRE NATIONAL DE LA RECHERCHE SCIENTIFIQUE, Paris (FR); INSTITUT NATIONAL DE RECHERCHE POUR L'AGRICULTURE, Paris (FR)

( * ) Notice: Subject to any disclaimer, the term of this patent is extended or adjusted under 35 U.S.C. 154(b) by 563 days.

(21) Appl. No.: 16/652,591

(22) PCT Filed: Oct. 19, 2018

(86) PCT No.: PCT/EP2018/078717
§ 371 (c)(1),
(2) Date: Mar. 31, 2020

(87) PCT Pub. No.: WO2019/077112
PCT Pub. Date: Apr. 25, 2019

(65) Prior Publication Data
US 2020/0316825 A1   Oct. 8, 2020

(30) Foreign Application Priority Data

Oct. 20, 2017 (FR) ..................... 17 59886

(51) Int. Cl.
*B29C 43/02*   (2006.01)
*B29C 43/00*   (2006.01)
(Continued)

(52) U.S. Cl.
CPC .......... *B29C 43/006* (2013.01); *B29C 43/003* (2013.01); *B29C 43/02* (2013.01);
(Continued)

(58) Field of Classification Search
CPC ..... B29C 43/006; B29C 43/003; B29C 43/02; B29C 43/52; C08L 89/04; C08L 89/00;
(Continued)

(56) References Cited

U.S. PATENT DOCUMENTS

| | | | |
|---|---|---|---|
| 2014/0326165 A1* | 11/2014 | Saleh | ............ C07K 14/78 524/21 |
| 2015/0283298 A1* | 10/2015 | Kaplan | ............ A61L 27/12 264/43 |

(Continued)

FOREIGN PATENT DOCUMENTS

| | | | |
|---|---|---|---|
| KR | 100825085 B1 | 4/2008 |
| KR | 100849020 B1 | 7/2008 |

(Continued)

OTHER PUBLICATIONS

Suraj Sharma et al., "Water Aided Fabrication of Whey and Albumin Plastics," J Polym Environ, Jul. 5, 2012, pp. 681-689, vol. 20, No. 3.

*Primary Examiner* — Jeffrey M Wollschlager
*Assistant Examiner* — Xue H Liu
(74) *Attorney, Agent, or Firm* — H&l PARTNERS; C. Andrew Im; Jean-Christophe Hamann

(57) ABSTRACT

A method for producing a part in the form of a solid block from a natural material in particulate form containing scle-
(Continued)

roproteins. A phase of heating the natural material, under compression at a pressure greater than or equal to 30 MPa, to a temperature greater than or equal to the denaturation temperature of the scleroproteins contained in the material. A phase of cooling the material thus obtained to a temperature less than 100° C., while maintaining the compression during at least a part of the cooling phase.

14 Claims, 4 Drawing Sheets

(51) Int. Cl.
*B29C 43/52* (2006.01)
*C08L 89/04* (2006.01)
*B29L 31/00* (2006.01)

(52) U.S. Cl.
CPC .............. *B29C 43/52* (2013.01); *C08L 89/04* (2013.01); *B29K 2089/00* (2013.01); *B29L 2031/7722* (2013.01); *C08L 2205/025* (2013.01)

(58) Field of Classification Search
CPC ........... C08L 2205/025; B29K 2089/00; B29L 2031/7722; C08H 1/00
USPC ......................................................... 264/483
See application file for complete search history.

(56) References Cited

U.S. PATENT DOCUMENTS

2016/0375176 A1 12/2016 Qiu et al.
2017/0112963 A1 4/2017 Malinin

FOREIGN PATENT DOCUMENTS

| KR | 20100042182 A | 4/2010 |
| WO | 01/66159 A1 | 9/2001 |
| WO | 2007/101171 A2 | 9/2007 |
| WO | 2012/069736 A1 | 5/2012 |

\* cited by examiner

METHOD FOR PRODUCING A PART FROM A PARTICULATE NATURAL MATERIAL AND PART OBTAINED BY SUCH A METHOD

RELATED APPLICATIONS

This application is a § 371 application of PCT/EP2018/078717 filed Oct. 19, 2018, which claims priority from French Patent Application No. 17 59886 filed Oct. 20, 2017, each of which is incorporated herein by reference in its entirety.

FIELD OF THE INVENTION

The present invention relates to the field of valorizing protein residues of animal origin.

More particularly, the present invention relates to a method for producing a part from a natural material in particulate form containing scleroproteins. The invention also relates to a part obtained by such a method of producing, and the use of such a part for the production of an article of eyewear, of jewellery or of tableware.

BACKGROUND OF THE INVENTION

The programmed depletion of fossil resources has been encouraging industrialists for several years to develop replacement solutions that implement renewable resources, and this in all fields of industry. The recycling and the valorization of waste of animal or plant origin are in this context of increasing interest, from an economic as well as environmental standpoint.

It has thus been proposed by the prior art to produce solid materials from waste of animal or plant origin, in particular by a method of hot and high-pressure molding of these wastes.

An example of such a method is described in document WO 2012/069736, for the production of a solid material from an organic material of plant origin containing polysaccharides or polypeptides.

The present inventors have taken more particularly interest in the natural raw materials of non-human animal origin, and in particular based on a particular type of proteins, scleroproteins.

Scleroproteins, also called fibrous proteins, form one of the three main classes of animal proteins. These are long molecules in the form of filaments, playing a structural and constitutive role in the organism, and entering into the composition of so-called supporting tissues, such as bones and connective tissues, as well as appendages, such as the skin, hairs, horns, hooves and nails. There are different types of them: keratins, which form protective tissues of the body, such as the epidermis, hairs, nails, hooves, horns or bird feathers; collagens, which form connective tissues, such as cartilages; conchiolin, which forms the shells of mollusks; and elastins, also present in connective tissues.

Much industrial waste coming from raising, such as horn, feathers, leather, or production scrap, such as the scrap generated during working with leather or working with horn, etc., are mainly formed of scleroproteins. Using this waste to produce solid material parts, intended for multiple and varied applications taking advantage of the esthetic and mechanical properties of these natural materials, would allow for an entirely interesting valorization thereof, from an economic as well as environmental standpoint.

OBJECT AND SUMMARY OF THE INVENTION

At the origin of the present invention, it was discovered by the present inventors that a method of treatment by high-temperature compression of natural materials in particulate form based on scleroproteins, such as materials based on leather or animal horn for example, this method being implemented in specific operating conditions, makes it possible to form massive parts in a material that has particularly advantageous mechanical properties, in particular good cohesion, a homogeneous structuring, good stability physically as well as esthetically, and having a low degree of hygroscopy.

Thus, the present invention aims to propose a method for producing a part from a natural material in particulate form based on scleroproteins, which makes it possible to obtain a solid material that reproduces the properties of the initial natural material, and even improving some of these properties.

An additional objective of the invention is that this method be simple and fast to implement.

In the present description, "natural material" means a material of natural origin, such as a material of animal origin, in opposition to synthetic materials. The natural material according to the invention can be a material that exists in nature, or a material obtained by transformation of such a material that exists in nature, for example by tanning the natural material that is skin of an animal, to form leather.

In order to achieve the objectives hereinabove, according to this invention a method is proposed for producing a part, in the form of a solid block, from a natural material in particulate form containing scleroproteins. This method comprises the following phases, carried out dry:

a phase of heating said natural material under compression at a pressure greater than or equal to 30 MPa, at a temperature greater than or equal to the denaturation temperature of the scleroproteins entering into the constitution of this material, and a phase of cooling the material thus obtained, referred to as denatured material, to a temperature less than 100° C.

The compression at a pressure greater than or equal to 30 MPa is maintained for at least a part of this cooling phase, more preferably for at least the initial part of this cooling phase, in particular for at least half of the cooling phase.

Preferably, the compression is maintained during the entire cooling phase.

The cooling can be carried out in any way, for example by dissipation of heat into the ambient air.

Typically, the material to which the method according to the invention is applied, of natural origin, contains more than 50% by weight of scleroproteins, with scleroproteins being substantially the only type of proteins that are present therein.

It is part of the skills of the person skilled in the art to determine, for a given initial natural material, what is the denaturation temperature of the scleroproteins that enters into the constitution thereof, in the conditions of pressure applied in the device implemented. This temperature depends in particular on the humidity rate of the material. To this effect, the person skilled in the art can in particular proceed with an analysis of the initial material by a technique known per se for the measuring of this parameter, for example by the differential scanning calorimetry technique (DSC), according to a conventional operating mode. Knowing the humidity rate of the material on which it is desired to implement the method according to the invention, the person skilled in the art can otherwise refer, in order to know the denaturation temperature of scleroproteins, to a pre-established chart, in particular via analyses by DSC of samples of this material that have different humidity rates, such as the chart shown in the accompanying FIG. 1.

The heating of the natural material at a temperature greater than or equal to the denaturation temperature of the scleroproteins causes therein a change in phase in the organized zones of these proteins, in particular the zones with an α helix or helices and/or β sheet(s) structure, and a loss of structure in these organized zones. The deformability of the material consequently increases. In doing this, the compression exerted on the material in accordance with the invention advantageously makes it possible to prevent water from accumulating in pores of the material.

The heating phase is moreover advantageously carried out at a temperature that remains less than the degradation temperature of the scleroproteins. The mechanical performance of the material obtained at the end of the method is advantageously better. It is part of the skills of the person skilled in the art to know how to determine this degradation temperature. To this effect, a thermogravimetric analysis (TGA) of a sample of the natural material can in particular be conducted, in a conventional manner in itself.

The so-called denatured material obtained at the end of the heating phase is then cooled, still under compression, to a temperature less than 100° C., which ensures that the denatured material no longer contains any water in the gaseous state.

Preferably, the denatured material is cooled to a temperature less than the glass transition temperature thereof. This glass transition temperature can easily be determined by the person skilled in the art, by means of any known technique for this purpose, for example by dynamic mechanical analysis (DMA), carried out on a sample of the denatured material.

Below the glass transition temperature thereof, the material obtained passes, in a conventional manner in itself, to the vitreous non-deformable state. The demolding of the part produced by the method according to the invention is then advantageously facilitated.

Preferably, the cooling phase is carried out as quickly as possible, according to what is permitted by the apparatus used for the implementing of the method according to the invention.

The method according to the present invention is carried out dry. It advantageously does not implement any solvent. This means that the natural material is subjected to the phases of the method according to the invention in the solid state, not in solution or suspension in a liquid. According to the invention the material can however have a humidity rate that is very substantial, and even be entirely impregnated with water.

It is obtained at the end of the method according to the invention a part formed from a solid block of material which has the esthetic aspect of the initial natural material, advantageously compact and densified, and having good cohesion and good solidity, of homogeneous structuring, physically and esthetically stable. This material furthermore has a lower hygroscopy, and a higher density, than those of the natural starting material. This densification gives the material of the part obtained improved mechanical properties, in particular good mechanical resistance and low deformability, as well as better resistance to humidity than the initial natural material. The part obtained furthermore has a flexural modulus and a tensile modulus that are similar, even better, than those of the initial natural material.

The part obtained by the method according to the invention is in particular much denser than the parts obtained by similar methods, but wherein the compression is not maintained during the cooling phase, or wherein the heating phase is carried out at a temperature less than the denaturation temperature of the scleroproteins contained in the initial natural material.

The material forming this part has a degree of deformability that can advantageously be controlled, through an adequate choice in the operating parameters of the method and of the initial humidity rate of the natural material. In particular, the water that may be present in the initial natural material plays the role of a plasticizer which makes it possible, at the end of the heating phase, for the chains of the denatured scleroproteins present in the material to slide over one another, which reinforces the deformability of the material obtained.

The method according to the invention, simple and fast to implement, furthermore makes it possible to control the properties of the final material, in particular by adding adequate additives to the initial natural material upstream from the heating phase.

It furthermore makes it possible to perfectly control the shape and the dimensions of the part formed, so that it is possible to produce parts that are suited for all the desired applications.

To this effect, the method according to the invention can be implemented by compression of the initial material in particulate form contained in a mold of suitable shape and dimensions and implementation of the heating phase, then of the cooling phase, on the material contained in this mold. Such a mold is conventional in itself. It can for example be formed from steel, graphite, tungsten carbide or silicone.

Otherwise, the method according to the invention can comprise a prior step of cold pre-forming of the natural material in particulate form, in order to form a solid preform which is then subjected to the heating phase, then to the cooling phase, under compression, of the method according to the invention.

The method according to the invention can furthermore satisfy one or more of the characteristics described hereinafter, implemented individually or in each one of the technically operable combinations thereof.

In particular embodiments of the invention the heating phase of the natural material is carried out by spark plasma sintering. The cooling phase is carried out in the same spark plasma sintering device, without any intercalary handling of the material that is contained therein.

The technique of Spark Plasma Sintering (called SPS) is well known to the person skilled in the art. It consists of passing a pulsed electric current through a matrix made of electrically conductive material, containing the compacted powdery material along a uniaxial direction. This causes the heating of the material via the Joule effect and electrical and thermal conduction.

In the framework of the method according to the invention, this technique can be implemented in a spark plasma sintering device that is conventional in itself, and according to operating conditions that are also conventional in themselves. The tooling used can for example consist in matrices and pistons made from graphite, but any other electrically-conductive material, in particular steel, is also suitable.

The implementation in accordance with the invention of the spark plasma sintering technique makes it possible to obtain a final material that is particularly dense, of a particularly homogeneous structure and that has particularly good mechanical properties.

Otherwise, the step of heating of the method according to the invention can be carried out by the technique, also conventional in itself, of hot-pressing, or high-pressure thermoforming.

The method according to the invention can be implemented at atmospheric pressure, or at a reduced pressure.

Preferably, the gases that are released from the natural material during the heating phase are removed continuously from the device used. Thus, the method according to the invention preferably comprises, during the heating phase, and preferably also during the cooling phase, a continuous step of degassing the chamber containing the natural material on which the method is implemented.

Prior to the heating phase, the method according to the invention can comprise steps of cleaning, sorting and/or degreasing of the natural material, as well as, optionally, a prior step of grinding this natural material in such a way as to ensure that it has a particulate form, and if necessary the desired granulometry.

Preferably, the particles of the natural material in particulate form containing scleroproteins, on which the method according to the invention is applied, all have a diameter comprised between 20 and 500 µm, preferably comprised between 100 and 500 µm.

Preferably, these particles have good homogeneity in terms of size.

These particles furthermore preferably have goof homogeneity in terms of shape, which can in particular be checked via observation under an electron microscope.

The method according to the invention is however also applicable to the natural materials of which the size of the particles is greater than this range of values, and including when these particles have a diameter or a length of one or more centimeters.

In particular embodiments of the invention the compression is carried out, at least during the heating step, at a pressure comprised between 30 and 100 MPa, for example about 50 MPa.

During the cooling step, it is preferably applied a compression of the material at the same pressure as during the heating step. This pressure can otherwise be less or be higher.

A maintaining of the compression of the material during the cooling step, and particularly in the range of values defined hereinabove, advantageously makes it possible to limit the porosity in the final material obtained, and consequently the quantity of water contained in this material. This results in mechanical and structural solidity properties that are particularly good for the material obtained at the end of the implementation of the method according to the invention.

In particular embodiments of the invention the heating phase of the natural material at a temperature greater than or equal to the denaturation temperature of the scleroproteins is implemented for a duration that is sufficient to ensure that all the natural material subjected to heating has reached a temperature greater than or equal to the denaturation temperature of the scleroproteins. A duration of the heating phase comprised between 1 and 45 minutes makes it possible to ensure this regardless of the dimensions of the part to be formed, and in particular the thickness thereof.

Depending on the thickness of the part, this duration of the heating phase can for example be comprised between 1 and 20 minutes.

The natural material in particulate form containing scleroproteins on which the method according to the invention is implemented preferably has a humidity rate comprised between 0 and 20%, for example about 12%. The invention also applies however to natural materials with a higher humidity rate, in particular as high as 65%.

"Humidity rate" is here defined, in a conventional manner, as the percentage by weight of water contained in the material, in relation to the total weight of the material, in conditions of 60% relative humidity of the air and at about 20° C. This humidity rate can in particular be determined by comparing the weight of a sample of the material with the weight of this same sample after it has been subjected to a step of drying at more than 100° C. until a weight of the sample that remains substantially constant is obtained.

Optionally, the method according to the invention can comprise a prior step of drying the natural material, in order to obtain the desired humidity rate.

Prior to the implementation of the heating phase, the method according to the invention can comprise a step of mixing the natural material in particulate form with one or more additives, chosen according to the properties desired for the final part. Non-limiting examples of such additives are plasticizers, reinforcing fibers, coloring agents, etc.

In particular embodiments of the invention the natural material is not mixed with any other component for the implementation of the method according to the invention.

In other particular embodiments of the invention, prior to the implementation of the heating phase, the method according to the invention comprises a step of mixing the natural material in particulate form with one or more additives, these additives being present in the mixture in a quantity less than 10% by weight, preferably less than 5% by weight, with respect to the total weight of the mixture.

Additives that are particularly preferred in the framework of the invention are plasticizers, such as glycerol or water (with the water being implemented, as an additive, in order to increase the humidity rate of the natural material), and coloring substances, such as pigments, for example iron oxide.

The natural material can for example come from horn, hoof, claw, wool, silk, hair, for example cashmere, feathers or leather, of animals.

For the implementation of the phases of the method according to the invention, the natural material can be doped with one or more substances, such as scleroproteins, which have been isolated, in particular by chemical extraction, from this natural material or from another type of natural materials. The natural material can thus for example be doped by collagen extracted from animal tissues.

The scleroproteins that are contained therein are for example substantially keratin scleroproteins or collagen proteins.

The method according to the invention is particularly advantageous for the production of a part from a natural material in particulate form containing proteins coming from mammal horn, for example cow horn, or coming from non-human animal leather.

According to another aspect, the present invention relates to a part obtained by a method for producing according to the invention, that satisfies one or more of the characteristics described hereinabove.

The material that forms this part has a lower hygroscopy, i.e. a lower tendency to absorb the humidity of the air, than the initial natural material. Thus, in identical conditions of relative humidity of the air and of temperature, the humidity rate of the final material obtained by the method according to the invention, is lower than the humidity rate of the initial natural material.

In particular embodiments of the invention, that material that forms this part has a humidity rate comprised between 0 and 20%, preferably less than 10%, and preferably less than 5%, in conditions of 60% relative humidity of the air and at a temperature of 20° C.

This part can in particular have been obtained by implementation of the method according to the invention on natural material based on scleroproteins of any non-human animal origin.

It can in particular have been obtained by implementation of the method according to the invention on a material coming from mammal horn, or on a material coming from non-human animal leather.

Its density is greater than that of the initial natural material. In the case where it was obtained from mammal horn, and in particular cow horn, it preferably has a density greater than or equal to 1.30 g/cm³.

According to another aspect, the invention relates to the use of a part according to the invention, that satisfies one or more of the characteristics hereinabove, for the production of an article of eyewear, of jewellery or of tableware, in particular as a handle of a piece of cutlery.

More generally, the part according to the invention is particularly suited to the production of luxury objects and accessories, watches, jewellery, etc.

It can also be used for the production of articles of marquetry, or for the decoration of firearms or hunting weapons, or for any other desired application.

BRIEF DESCRIPTION OF THE DRAWINGS

The characteristics and advantages of the invention shall appear more clearly in light of the embodiments hereinafter, provided simply for illustrative purposes and in no way limiting to the invention, with the support of FIGS. 1 to 9B, wherein.

DETAILED DESCRIPTION OF THE EMBODIMENTS

A) IMPLEMENTATION OF THE METHOD ON COW HORN POWDER

The examples hereinafter are implemented using Aubrac cow horn.

The natural horn is subjected beforehand to a step of grinding, in order to form a horn powder of which the particles have a diameter comprised between 200 and 500 µm.

The density of the untreated horn is 1.28±0.01 g/cm³.

The curve that represents the denaturation temperature of the proteins contained in this cow horn powder, according to the humidity rate of the powder, is established by differential scanning calorimetry (DSC) using a DSC1 instrument (Mettler-Toledo), with steel capsules medium pressure of 80 µL, at 10° C./min.

Figure 1:
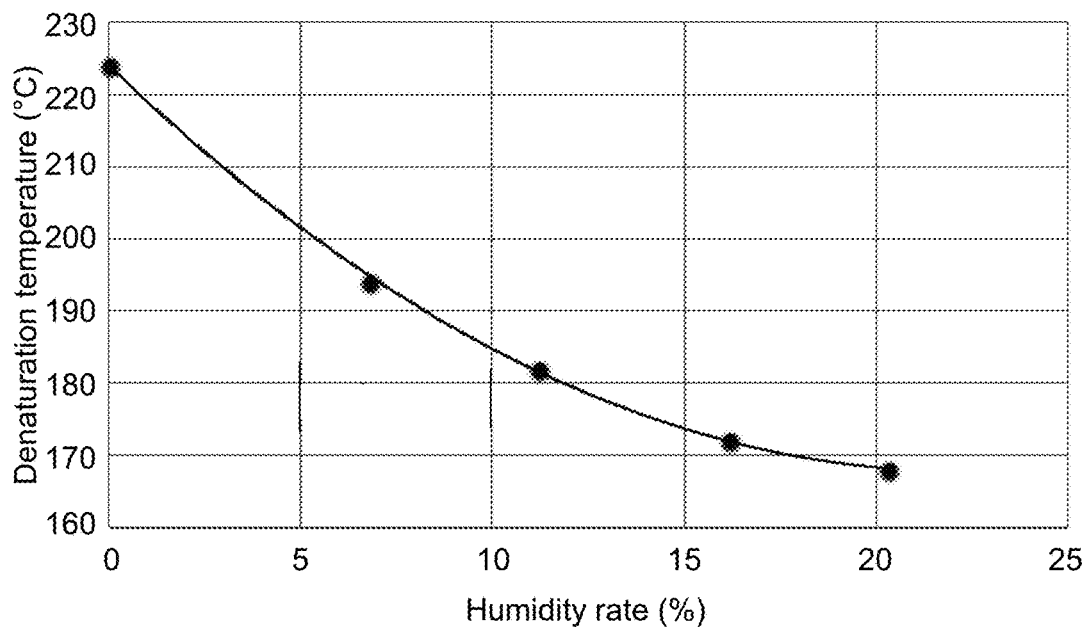
FIG. 1 shows a graph that represents the denaturation temperature of the proteins contained in a sample of cow horn according to the humidity rate thereof, measured by differential scanning calorimetry.

The result obtained is shown in FIG. 1.

It is observed for example that at a humidity rate of 9.6% (this rate can be obtained after drying of the horn at 40° C.), the denaturation temperature of the proteins is about 185° C.

Moreover, the glass transition temperature of the denatured proteins is determined by dynamic mechanical analysis (DMA), using a Tritec 2000 DMA apparatus (Triton Technology Ltd), single cantilever, 2° C./min.

To this effect, the horn powder at a humidity rate of 11.7% is subjected to high-pressure uniaxial molding, at 200° C. and 100 MPa for 3 min, using a MAPA 50 instrument (Pinette Emidecau Industries), in a square mold of 5 cm each side.

The glass transition temperature of the material (reconstituted horn) thus obtained is measured by dynamic mechanical analysis.

Figure 2:
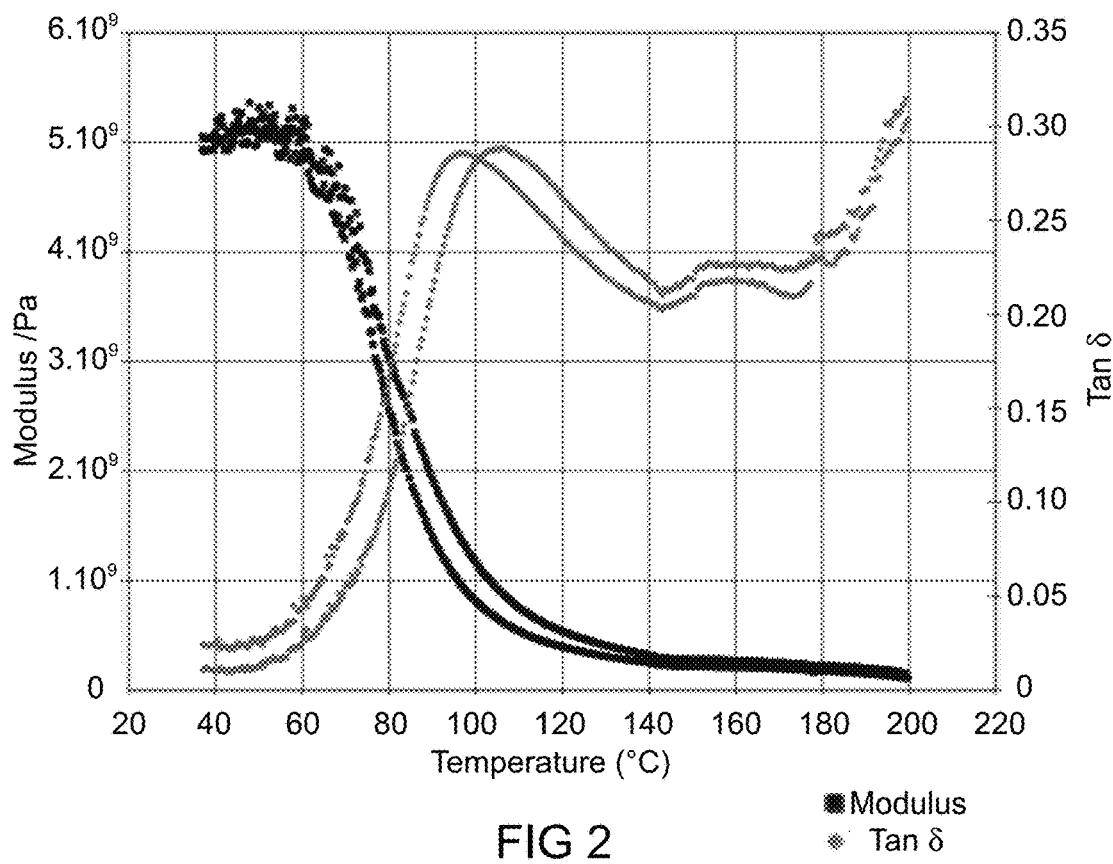
FIG. 2 shows a graph that represents the results of the dynamic mechanical analysis (Young's modulus and tan δ) according to the temperature, of a material obtained by high-pressure uniaxial molding of cow horn at 200° C. and 100 MPa.

The result obtained is shown in FIG. 2.

It is measured that the glass transition temperature of the material, after denaturation of the proteins that it is formed of, is 95° C.

The material implemented for the experiments hereinafter has a humidity rate of 11.7% at 60% relative humidity of the air and a temperature of 20° C. At this humidity rate, the denaturation temperature of proteins is 181° C. at an atmospheric pressure.

EXAMPLE 1

Method by Spark Plasma Sintering

A method according to the invention is implemented for the production of a cylindrical part 160 mm in diameter and 22 mm high, from the horn powder.

The tools used consist of a matrix and pistons made of graphite. The dimensions of the matrix are as follows:
outer diameter: 230 mm
inner diameter: 160 mm.

The inner bore of the matrix is covered with a flexible graphite sheet, the function of which is to ensure the tightness of the assembly, and to prevent jamming between the matrix and the pistons. A graphite sheet is also positioned on the surfaces of the pistons in contact with the powder, in order to prevent the sintered material from sticking to the pistons.

The quantity of desired powder is introduced into the matrix, which is then closed by the two pistons. The whole is then disposed in the chamber of the spark plasma sintering device (Sumitomo Sinter 2000), which is placed under reduced pressure, at 5-10 Pa. The device is then programmed to apply on the matrix containing the powder a compression at a pressure of 32 MPa in 4 min.

Simultaneously, the whole is heated by the Joule effect by an electrical current passing through the pistons and passing through the walls of the graphite matrix. The whole is brought to 150° C. in 7 min. The control of the temperature is carried out with a thermocouple inserted on the outer wall of the matrix. At this temperature, at this reduced pressure, the proteins entering into the constitution of the powder undergo the phenomenon of denaturation.

The temperature is maintained at 150° C. for 10 min, after which the heating is cut off. The compression is maintained until the temperature inside the matrix reaches a value of 70° C., less than the glass transition temperature of the denatured proteins. The device is then opened, and the formed part is removed from the matrix.

Figure 3:
FIG. 3 shows a graph that represents, as a function of time, the temperature and the compression applied during the implementation of a spark plasma sintering method in accordance with the invention from cow horn powder, with the pressure being expressed in terms of displacement of the pistons of the spark plasma sintering device.

FIG. 3 shows the temperature and compression profiles of the matrix that contains the material, which are applied as a function of time (with the compression profile expressed in terms of displacement of the pistons).

It is observed that after 10 min of maintaining the temperature in the matrix at 150° C., the temperature progressively decreases. In parallel, the compression exerted on the matrix is substantially constant, the displacement of the pistons, by a few millimeters, being due to the changes in the state of the material inside the matrix.

Figure 4:
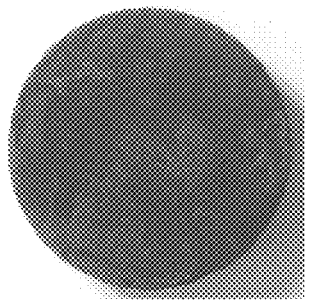
FIG. 4 shows a photograph of a pellet obtained by a spark plasma sintering method in accordance with the invention from cow horn powder.

At the end of the method, a pellet of densified horn of the desired shape is obtained, of an intense black color. This part is shown in FIG. 4.

EXAMPLE 2

Method by High-Pressure Thermoforming (HPHT)

The device used is a MAPA 50 instrument (Pinette Emidecau Industries).

The powder is placed in a rectangular mold of dimensions 5×1 cm, at a temperature of 200° C., greater than the denaturation temperature of the proteins. It is then compressed, at this temperature, at a pressure of 100 MPa, for 5 min. The whole is then cooled to a temperature of 90° C., less than the glass transition temperature of the denatured proteins, still under compression, before demolding.

The material obtained at the end of the method is dark, and denser than the initial untreated horn: the density of this material is 1.31±0.02 g/cm$^3$.

EXAMPLE 3

Characterizations of the Materials

Water Adsorption Isotherms

The water adsorption isotherms are established by the dynamic vapor sorption technique (DVS), using a DVS Advantage instrument (Surface Measurements Systems), at 5% to 95% relative humidity, with an interval of 10% and at 25° C., for: untreated cow horn (piece of horn of about 300 mg), the same horn after grinding (particle diameter comprised between 200 and 500 µm), and the material obtained by an HPHT method in accordance with the invention in Example 2 hereinabove.

Figure 5:
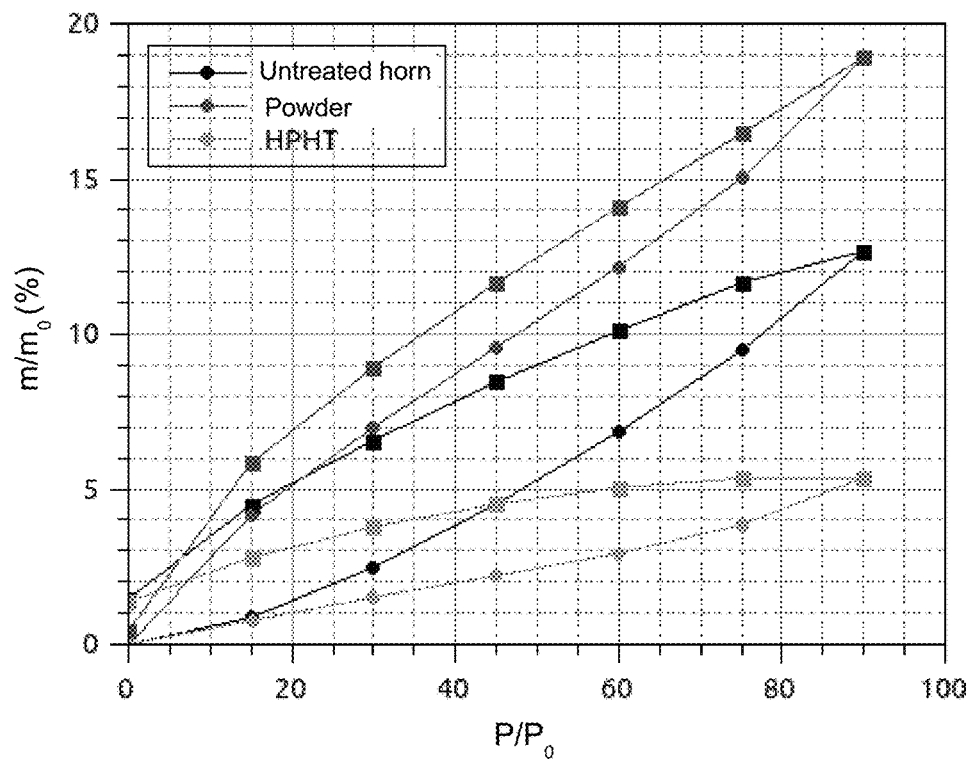
FIG. 5 shows a graph that represents the water adsorption isotherms for untreated cow horn ("Untreated horn"), this cow horn after grinding ("Powder"), and the material obtained from this powder by a high-pressure thermoforming method in accordance with the invention ("HPHT")

The results obtained are shown in FIG. 5.

An increase in the hygroscopy of the native horn after grinding is very clearly observed here. This is mainly linked to the increase in the specific surface of the material.

Then after transformation by high-pressure thermoforming in accordance with the present invention, the opposite effect is observed. The denaturation of the scleroproteins has caused a clear decrease in the hygroscopy (3% adsorbed water at 60% relative humidity, compared to 7% for the natural untreated horn for example). This could be due to the deployment on the surface of more hydrophobic amino acids during the modification of the secondary structures of the scleroproteins induced by the method according to the invention.

Infrared Spectroscopy

A Fourier transform infrared spectroscopy analysis (FTIR) is conducted, using a Spectrum 65 instrument (PerkinElmer), for: untreated cow horn, the same horn after grinding, the material obtained by a method of spark plasma sintering (SPS) in accordance with the invention in Example 1 hereinabove and the material obtained by an HPHT method in accordance with the invention in Example 2 hereinabove.

Figure 6:
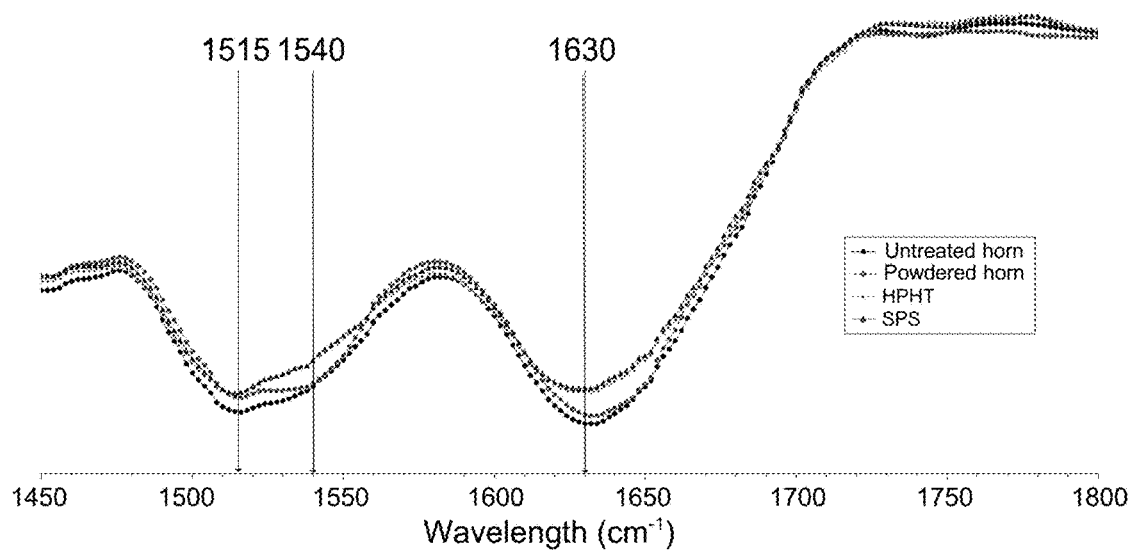
FIG. 6 shows the spectra obtained by FTIR infrared spectroscopy for untreated cow horn ("Untreated horn"), this cow horn after grinding ("Powdered horn"), the material obtained from this powder by a spark plasma sintering method in accordance with the invention ("SPS") and the material obtained from this powder by a high-pressure thermoforming method in accordance with the invention ("HPHT")

The results obtained are shown in FIG. 6.

A modification in the vibration frequency of the amide I band is observed in this figure: 1633 cm$^{-1}$ for the native horn and 1627 cm$^{-1}$ for the horn after SPS treatment and 1628 cm$^{-1}$ for the horn after HPHT treatment. This modification is characteristic of the modification of the secondary structure of the keratin during the implementation of the method according to the invention.

The amide II band (about 1530 cm$^{-1}$) is rather relative to the environment of the N—H groups, and the drop in the intensity observed at 1540 cm$^{-1}$ could be relative to a decrease in the hydrogen bonds of these groups after transformation by the method according to the invention.

DSC Analyses

For each one of the following materials: untreated horn (in the form of a piece of about 20 mg), the same horn after grinding (particle diameter comprised between 200 and 500 µm), the material obtained by an SPS method in accordance with the invention in Example 1 hereinabove and the material obtained by an HPHT method in accordance with the invention in Example 2 hereinabove, a differential scanning calorimetry (DSC) analysis is conducted using a DSC1 instrument (Mettler-Toledo), with steel capsules medium pressure of 80 µL, at 10° C./min.

Figure 7:
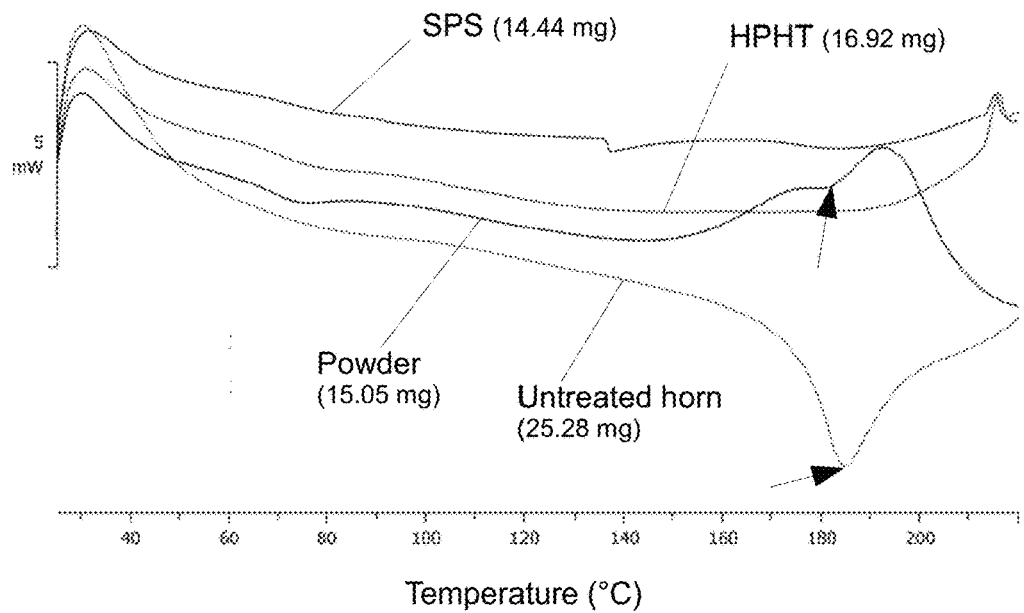
FIG. 7 shows a graph that represents, for untreated cow horn ("Untreated horn"), this cow horn after grinding ("Powder"), the material obtained from this powder by a spark plasma sintering method in accordance with the invention ("SPS") and the material obtained from this powder by a high-pressure thermoforming method in accordance with the invention ("HPHT"), the variation in energy according to the temperature, measured by differential scanning calorimetry.

For each material the curve representing the variation in energy according to the temperature shown in FIG. 7 is obtained.

These results confirm that the peaks that materialize the endothermic phenomenon associated with the denaturation of the proteins, present on the curves for the samples of untreated horn (these peaks are indicated by arrows in the figure) do not appear on the curves of the samples obtained after treatment of the horn by a method according to the invention. This confirms that the proteins contained in the materials obtained by methods in accordance with the invention were indeed all denatured during the implementation of these methods.

X-ray Diffraction Analysis

For each one of the following materials: untreated horn (in the form of a piece of about 20 mg), the material obtained by an SPS method in accordance with the invention in Example 1 hereinabove and the material obtained by an HPHT method in accordance with the invention in Example 2 hereinabove, an X-ray diffraction (XRD) analysis is conducted using a Bruker D8 Advance instrument.

Figure 8:
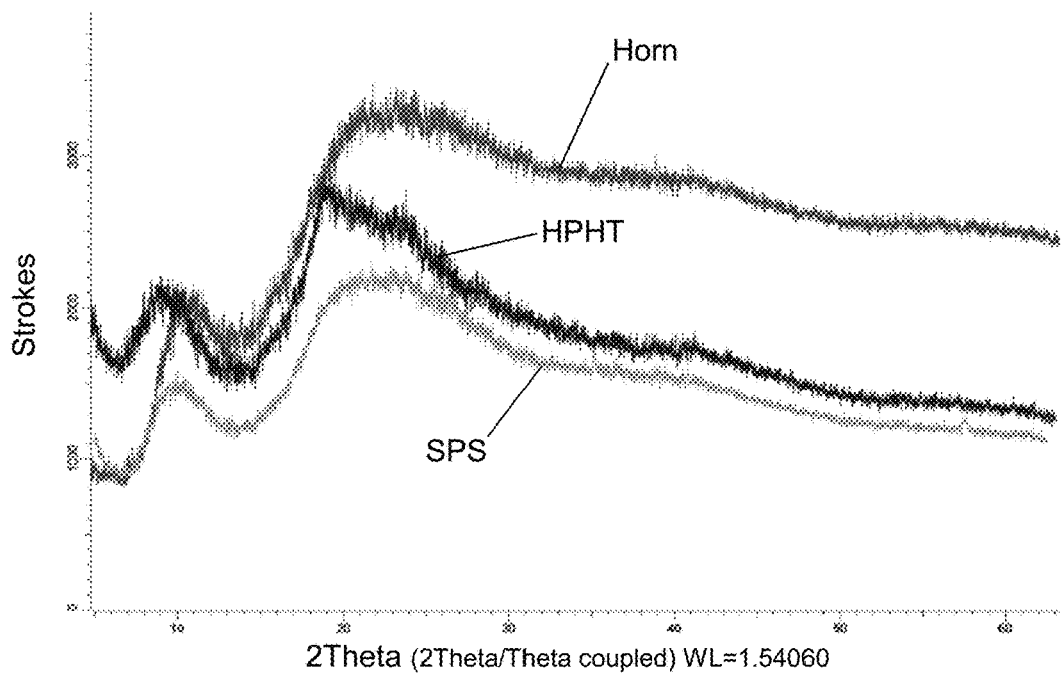
FIG. 8 shows a diagram of X-ray diffraction obtained for untreated cow horn ("Horn"), the material obtained from this powder by a spark plasma sintering method in accordance with the invention ("SPS") and the material obtained from this powder by a high-pressure thermoforming method in accordance with the invention ("HPHT")

For each material the diagram shown in FIG. 8 is obtained.

The absence of diffraction peaks on these diagrams, and the sole presence of a diffusion signal linked to the particular structure of the horn, demonstrate that the final material obtained by the method according to the invention is mainly amorphous.

Moreover, nitrogen absorption/desorption experiments show that the physical structure of the materials obtained by the SPS method as well as by the HPHT method, implemented in accordance with the invention, approach that of an elastic matrix with different networks of porosity (micro/meso/macroscopic) that communicate. The observation of these materials under the optical microscope and under the scanning electron microscope confirm this hypothesis.

EXAMPLE 4

Comparative Example

Aubrac cow horn in the form of powder of which the particles have a diameter of 250 μm, having a humidity rate of 0%, is implemented in this example.

The denaturation temperature of the proteins contained in this horn powder, measured by DSC, is greater than 240° C.

The powder is subjected to a high-pressure thermoforming method, according to the conditions described in Example 2 hereinabove, but with a heating temperature of 220° C., 225° C. or 230° C., less than the denaturation temperature of the proteins.

For each one of the temperatures tested, at the end of this method a block of compressed powder is obtained, of which the density is not greater than that of the initial powder and having a low degree of cohesion.

B) IMPLEMENTATION OF THE METHOD ON LEATHER

These examples are implemented using leather coming from shaving, in the form of ground fiber of which the granulometry is located between 100 and 250 μm.

Figure 9A:
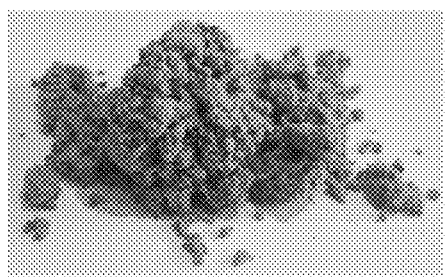
FIG. 9A shows a photograph of a sample of non-human animal leather in particulate form.

FIG. 9A shows a photograph of the natural starting material.

EXAMPLE 5

This material is subjected to a spark plasma sintering method in accordance with the invention. The operating protocol is similar to the one described in Example 1 hereinabove, except for the fact that the heating temperature is 140° C. In the conditions applied, the scleroproteins contained in the initial material are denatured.

Figure 9B:
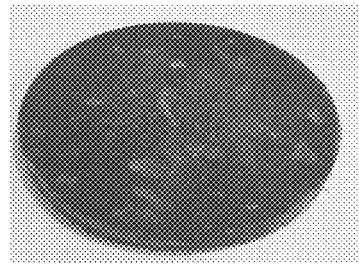
FIG. 9B show a photograph of a part obtained from this sample by a spark plasma sintering method in accordance with the invention.

At the end of this method the part shown in FIG. 9B is obtained. This part has the aspect of natural leather, and properties that are improved with respect to the natural starting material.

EXAMPLE 6

The humidity rate of the material implemented in this example is comprised between 15 and 20%. At such a humidity rate, the denaturation temperature of the scleroproteins is measured to be 140° C. The density of this powdery material is comprised between 0.1 and 0.5 g/cm$^3$.

The powder is subjected to a high-pressure thermoforming method, according to the conditions described in Example 2 hereinabove, but with a heating temperature of 65° C. or 110° C., less than the denaturation temperature of the proteins, or with a heating temperature of 150° C., greater than the denaturation temperature of the proteins.

For the sample treated at 150° C., in accordance with the invention, a compact solid block that is denser than the initial natural material is obtained, more particularly of a density comprised between 1.1 and 1.3 g/cm$^3$. The material obtained has good mechanical properties, in flexural as well as tensile terms. The flexural modulus thereof is for example comprised between 1,600 and 2,500 MPa.

However, for each one of the temperatures of 65° C. and 110° C., at the end of this method, a block with low coherence is obtained, of which pieces are detached, and of which the mechanical properties are much lower than those of the part obtained in accordance with the invention. In particular, the value of the flexural modulus, which reflects the solidity and the rigidity of the part, is more than 4 times less than that obtained for the part treated in accordance with the invention (flexural modulus comprised between 350 and 450 MPa).

EXAMPLE 7

Comparative Example

The powder with a humidity rate of 15% is placed in the high-pressure thermoforming device and treated at a temperature of 170° C., greater than the denaturation temperature of the proteins, under compression at a pressure of 81 MPa, for 5 min. The compression is then stopped, and the whole is cooled by dissipation to a temperature of 90° C., before demolding.

A part is obtained of which the density is less than that of the initial material.

EXAMPLE 8

This example is implemented using leather that has been subjected to a vegetable tanning, in the form of powder with a density of 0.2 g/cm$^3$, of which the granulometry is comprised between 500 and 1,000 μm.

The powder is placed in a mold at a temperature of 150° C., greater than the denaturation temperature of the proteins. It is compressed, at this temperature, at a pressure of 81 MPa, for 4 min. The whole is then cooled to a temperature of 90° C., less than the glass transition temperature of the denatured proteins, still under the same compression, before demolding.

The material obtained is ground and analyzed by Fourier transform infrared spectroscopy using a spectrometer provided with an ATR (attenuated total reflectance) system with a diamond tip.

With respect to the spectrum carried out in the same conditions for the initial material, a substantial decrease in the peak is observed at 1,661 $cm^{-1}$, corresponding to the α helices in the characteristic zone of the amide I. This reflects a decrease in the quantity of α helices in the structure of the scleroproteins from 48% for the initial material to 12% for the final material, showing that the denaturation of the scleroproteins was indeed carried out.

Furthermore no appearance of a new peak is observed on the spectrum obtained for the final material, with respect to the initial material, which demonstrates that there was no formation or appearance of any compound during the implementation of the method according to the invention: the treatment according to the invention indeed modified the secondary structure of the scleroproteins without degrading them.

A DSC analysis of the material obtained furthermore shows that, with respect to the initial material, the area of the endothermic peak associated with the thermal denaturation of the scleroproteins has significantly decreased.

C) IMPLEMENTATION OF THE METHOD ON OTHER NATURAL MATERIALS

In all of these examples, a high-pressure thermoforming device MAPA 50 (Pinette Emidecau Industries) is used. The natural material in granular form is placed in the device in a rectangular mold of dimensions 5×1 cm.

EXAMPLE 9

Split Horn 10 g of cow horn in the form of needles 2 to 4 cm long, containing α keratin as the main protein, with a humidity rate of 11% (denaturation temperature of the scleroproteins of 180° C.), are subjected to a high-pressure thermoforming method, at a temperature of 210° C., greater than the denaturation temperature of the proteins, under compression at a pressure of 92 MPa, for 210 s. The whole is then cooled to a temperature of 90° C., less than the glass transition temperature of the denatured proteins, still under compression, before demolding. The part obtained at the end of the method is denser than the initial material, it is compact and has a smooth surface.

EXAMPLE 10

Feather 8 g of pieces of duck feathers roughly cut in the form of pieces of 2 to 4 cm, containing keratin as the main protein (denaturation temperature of the scleroproteins of 180° C.), are subjected to a high-pressure thermoforming method, at a temperature of 210° C., greater than the denaturation temperature of the proteins, under compression at a pressure of 92 MPa, for 150 s. The whole is then cooled to a temperature of 90° C., less than the glass transition temperature of the denatured proteins, still under compression, before demolding. The part obtained at the end of the method is denser than the initial material, it is compact and has a smooth surface.

EXAMPLE 11

Cashmere 10 g of cashmere goat from 2 to 4 cm long, containing α keratin as the main protein, with a humidity rate of 70% (denaturation temperature of the scleroproteins of 110° C.) are subjected to a high-pressure thermoforming method, at a temperature of 150° C., greater than the denaturation temperature of the proteins, under compression at a pressure of 46 MPa, for 210 s. The whole is then cooled to a temperature of 90° C., less than the glass transition temperature of the denatured proteins, still under compression, before demolding. The part obtained at the end of the method is denser than the initial material, it is compact and has a smooth surface. A vitrification of the initial material has occurred.

EXAMPLE 12

Whole Silk 10 g of pieces of silk of 1 $cm^2$, containing fibroin as the main protein, with a humidity rate of 60%, are subjected to a high-pressure thermoforming method, at a temperature of 230° C., greater than the denaturation temperature of the proteins, under compression at a pressure of 50 MPa, for 210 s. The whole is then cooled to a temperature of 90° C., less than the glass transition temperature of the denatured proteins, still under compression, before demolding. The part obtained at the end of the method is denser than the initial material, it is compact and has a smooth surface.

EXAMPLE 13

Defibered Silk 10 g of silk fibers from 2 to 4 cm long, with a humidity rate of 60%, are subjected to a high-pressure thermoforming method, at a temperature of 230° C., greater than the denaturation temperature of the proteins, under compression at a pressure of 59 MPa, for 210 s. The whole is then cooled to a temperature of 90° C., less than the glass transition temperature of the denatured proteins, still under compression, before demolding. The part obtained at the end of the method is much denser than the initial material, it is compact and has a smooth surface.

EXAMPLE 14

Wool 10 g of pieces of wool from 2 to 4 cm long, containing α keratin as the main protein, with a humidity rate of 11% (denaturation temperature of the scleroproteins of 130° C.) are subjected to a high-pressure thermoforming method, at a temperature of 150° C., greater than the denaturation temperature of the proteins, under compression at a pressure of 50 MPa, for 210 s. The whole is then cooled to a temperature of 90° C., less than the glass transition temperature of the denatured proteins, still under compression, before demolding. The part obtained at the end of the method is denser than the initial material, it is compact and has a smooth surface.

The invention claimed is:

1. A method for producing a part in a form of a solid block, from a natural material in a particulate form containing scleroproteins, comprising, carried out dry:
   a phase of heating the natural material under compression at a pressure greater than or equal to 30 MPa and at a temperature greater than or equal to a denaturation temperature of the scleroproteins to obtain a denatured material; and
   a phase of cooling the denatured material to a temperature less than 100° C., the compression at the pressure greater than or equal to 30 MPa being maintained for at least a part of the phase of cooling.

2. The method according to claim 1, wherein the phase of cooling the denatured material is carried out to a temperature less than a glass transition temperature of the denatured material.

3. The method according to claim 1, wherein the compression at the pressure greater than or equal to 30 MPa is maintained for at least half of the phase of cooling.

4. The method according to claim 3, wherein the compression at the pressure greater than or equal to 30 MPa is maintained for all of the phase of cooling.

5. The method according to claim 1, wherein the phase of heating the natural material is carried out by a spark plasma sintering.

6. The method according to claim 1, wherein the compression is carried out at a pressure between 30 and 100 MPa.

7. The method according to claim 1, wherein the phase of heating the natural material is for a duration between 1 and 45 minutes.

8. The method according to claim 1, wherein particles of the natural material in the particulate form have a diameter between 20 and 500 μm.

9. The method according to claim 1, further comprising grinding the natural material prior to the phase of heating.

10. The method according to claim 1, wherein the natural material in the particulate form containing scleroproteins has a humidity rate between 0 and 20% in conditions of 60% relative humidity of the air and a temperature of 20° C.

11. The method according to claim 1, wherein the scleroproteins are keratin proteins.

12. The method according to claim 1, wherein the natural material in the particulate form containing scleroproteins is of non-human animal origin.

13. The method according to claim 1, wherein the natural material in the particulate form containing scleroproteins is from a mammal horn.

14. The method according to claim 1, wherein the natural material in the particulate form containing scleroproteins is from a non-human animal leather.

* * * * *